United States Patent
Kreiner et al.

(10) Patent No.: US 7,925,794 B2
(45) Date of Patent: *Apr. 12, 2011

(54) SYSTEMS AND METHODS FOR LOCALIZING A NETWORK STORAGE DEVICE

(75) Inventors: Barrett Kreiner, Woodstock, GA (US); Jonathan Reeves, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 728 days.

This patent is subject to a terminal disclaimer.

(21) Appl. No.: 11/840,248

(22) Filed: Aug. 17, 2007

(65) Prior Publication Data

US 2009/0049117 A1   Feb. 19, 2009

(51) Int. Cl.
*G06F 15/16* (2006.01)

(52) U.S. Cl. ............................ 709/250; 709/230; 710/11

(58) Field of Classification Search ................. 709/249, 709/230; 370/465; 710/104
See application file for complete search history.

(56) References Cited

U.S. PATENT DOCUMENTS

| | | | |
|---|---|---|---|
| 5,615,344 A | 3/1997 | Corder | |
| 5,768,598 A | 6/1998 | Marisetty et al. | |
| 6,073,201 A * | 6/2000 | Jolley et al. | 710/315 |
| 6,553,408 B1 | 4/2003 | Merrell et al. | |
| 6,654,817 B1 | 11/2003 | Huang | |
| 6,763,409 B1 | 7/2004 | Elliott | |
| 6,845,496 B2 | 1/2005 | Honmura | |
| 6,968,419 B1 | 11/2005 | Holman | |
| 6,985,988 B1 | 1/2006 | Nsame | |
| 7,188,276 B2 | 3/2007 | Yun | |
| 7,343,558 B2 | 3/2008 | Kadota | |
| 7,409,478 B2 | 8/2008 | Kreiner et al. | |
| 7,412,588 B2 | 8/2008 | Georgiou et al. | |
| 2002/0062387 A1 | 5/2002 | Yatziv | |
| 2002/0143942 A1 | 10/2002 | Li | |
| 2002/0169521 A1 | 11/2002 | Goodman et al. | |
| 2002/0188718 A1 | 12/2002 | McGraw et al. | |
| 2003/0058274 A1 | 3/2003 | Hill | |
| 2003/0223585 A1 | 12/2003 | Tardo | |
| 2003/0229689 A1 | 12/2003 | Raghavan | |
| 2004/0073727 A1 | 4/2004 | Moran | |
| 2004/0098600 A1 | 5/2004 | Eldeeb | |
| 2004/0117522 A1 | 6/2004 | Lofflink | |
| 2004/0123119 A1 | 6/2004 | Buer | |
| 2004/0133894 A1 | 7/2004 | Juszkiewicz et al. | |

(Continued)

OTHER PUBLICATIONS

Network file system, Wikipedia, http://en.wikipedia.org/wiki/Distributed_file_system, last modified Apr. 4, 2007.

(Continued)

*Primary Examiner* — Salad Abdullahi
(74) *Attorney, Agent, or Firm* — Parks IP Law LLC; Jennifer P. Medlin, Esq.

(57) ABSTRACT

Provided are methods, systems and devices for localizing data existing on a distributed network which comprises receiving an instruction within a programmable logic device ("PLD") for controlling a network peripheral from a client computing system, the PLD being in communication with the network peripheral via a modem and also in communication with the computing device via a generic interface and receiving a task request from the computing device via the generic interface to be accomplished according to the instruction. The methods, systems and devices further provide for augmenting the task request with an additional instruction provided by a meta-behavior interface.

14 Claims, 5 Drawing Sheets

U.S. PATENT DOCUMENTS

| | | | |
|---|---|---|---|
| 2004/0153848 | A1 | 8/2004 | Cromer |
| 2004/0193791 | A1 | 9/2004 | Felton |
| 2004/0201931 | A1 | 10/2004 | Korcharz |
| 2004/0221070 | A1 | 11/2004 | Ortega |
| 2004/0221123 | A1 | 11/2004 | Lam |
| 2004/0225762 | A1 | 11/2004 | Poo |
| 2005/0015179 | A1 | 1/2005 | Dickey et al. |
| 2005/0021874 | A1 | 1/2005 | Georgiou et al. |
| 2005/0066046 | A1 | 3/2005 | Chadalapaka |
| 2005/0172000 | A1 | 8/2005 | Nakamura |
| 2005/0187939 | A1 | 8/2005 | Krithivas |
| 2005/0281254 | A1 | 12/2005 | Harris |
| 2006/0036786 | A1 | 2/2006 | Kreiner |
| 2006/0245533 | A1 | 11/2006 | Rostampour |
| 2007/0050106 | A1 | 3/2007 | Chinnadurai |
| 2007/0050689 | A1 | 3/2007 | Sasakura |
| 2008/0209091 | A1 | 8/2008 | Nadarajah et al. |
| 2008/0270651 | A1 | 10/2008 | Kreiner |

OTHER PUBLICATIONS

Asynchronous Transfer Mode, Wikipedia, http://en.wikipedia.org/wiki/Asynchronous_Transfer_Mode, last modified Apr. 7, 2007.

EFGT120 EtherFast Network Attached Storage, Linksys, http://linksys.com/servlet/Satellite?c=L_Product_C2&childpagename=US%2FLayo, dated unknown.

NSLU2 Network Storage for USB 2.0 Disk Drives Easily Add Storage Space to Your Network, Linksys, http://www.linksys.com/servlet/Satellite?c=L_Product_C2&childpagename=US%2FLay.

Gerasimov, T, et al., "Design and Implementation of a Block Storage Multi-Protocol Converter. Mass Storage System" Systems and Technologies 2003 (MSST 2003). Proceedings. NASA Goddard Conference on.

P.H.W. Long et al., "Pilchard-Reconfigurable Computing Platform with Memory Slot Interace", 2001 IEEE Symposium on Field-Programmable Custom Computing Machines (FCCM).

"Network-Drivers.com" 3Com 3C509 driver—3Com Network Drivers-5x9c32.exe; http://www.network-drivers.com/drivers/155/155121.htm. Jan. 16, 2006.

"Network-Drivers.com" 3Com.65507 driver—3Com Network Drivers—65507; http://www.network-drivers.com/companies/2.htm. Jan. 14, 2006.

"PCI on GlobalSpec"; Find PCI/Card/Compact/2.2 PCI Standard/PCI on GlobalSpec; http://pci.globalspec.com/ Jan. 14, 2006.

"It's here. It's real. It's amazing. Mac OS X on Intel." http://apple.com/macosx/ Jan. 14, 2006.

Operating Systems; Sun Software; http://www.sun.com/software/index.jsp?cat=Operating%20Systems&tab=3 Jan. 14, 2006.

Linux Os Download; The Linux Home Page at Linux Online; http://www.linux.org. Jan. 14, 2006.

* cited by examiner

SYSTEMS AND METHODS FOR LOCALIZING A NETWORK STORAGE DEVICE

TECHNICAL FIELD

The subject matter described herein relates to the field of electronics. More particularly it relates to systems, devices and methods using programmable logic devices to allow a wide area network device to appear to a local computing device as a network file system.

BACKGROUND

The ownership and use of computers is ubiquitous. Most businesses and homes have at least one computer that utilizes one of several operating systems such as Windows®, UNIX®, Apple® or LINUX®. Over time, computers have improved exponentially in memory size, speed and capability as operating systems have become larger and more sophisticated. Similarly, the development and widespread use of the internet has levered the ever improving capacity of computers by expanding the data available to any computer to a potentially infinite scale by allowing distributed computing.

Historically, conventional computer design has used the computer's operating system itself to manage the operation of a computer's disk drives, peripherals and to access the internet. The management of peripherals and exchange of information with internet based devices is a task that is cumulative to the task of running the user applications which is the primary concern of a user. As a result, today's operating systems have become bloated with unnecessary peripheral drivers, data management instructions and house keeping routines such as disk operation, defragmentation and disk clean-up. Operating systems are also used to control modems, launch web browsers, manage pagefiles, block files and as a platform used to coordinate antivirus protection. The greater functionality of ever more sophisticated and larger operating systems has required larger memory devices and faster microprocessors which in turn require more electrical power.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Provided are exemplary embodiments. The embodiments include an apparatus in communication with a computing system comprising an interface, whereby the computing system employs the apparatus. The apparatus also includes a programmable logic device ("PLD") in communication with the computing system through the interface. The PLD communicates with the computing system via the interface using a first file system protocol to store and to retrieve data from a network peripheral. The PLD is also in communication with the network peripheral device via a modem and communicates with the network peripheral device using a second file system protocol that is foreign to the computing system to store and retrieve data using the network peripheral on behalf of the computing system.

Exemplary embodiments also include a method for localizing data existing on a distributed network which comprises receiving an instruction within a programmable logic device ("PLD") for controlling a network peripheral from a computing system. The PLD is in communication with the network peripheral via a modem and also in communication with the computing device via a generic interface and receives a task request from the computing device via the generic interface to be accomplished according to the instruction. The method further comprises modifying the task request with an additional instruction provided by a meta-behavior interface and issuing one or more commands to the peripheral device via the modem in response to the modified task request. Upon issuing the one or more commands, receiving a result from the peripheral device upon completion of the modified task request and then returning an indication of the result to the computing device via the generic interface.

Exemplary embodiments also include a method for localizing data existing on a distributed network is provided that includes receiving an instruction within a programmable logic device ("PLD") from a network device, the PLD being in communication with the network device via a modem and also in communication with the computing device via a generic interface, receiving a task request from the network device via the modem to be accomplished according to the instruction, and receiving an augmenting instruction to the task request from the network device via a meta-behavior interface between the network device and the computing device. The method further includes executing the task request according to the instruction and the augmenting instruction. Upon executing the task request, returning an indication of a task result to the computing device via the generic interface and to the network device via the modem.

Exemplary embodiments include a computer-readable medium containing an auxiliary program within a logic device in communication with an operating system that executes instructions to create a data storage and a network file system that are foreign to the operating system with which to store data to and retrieve data from a peripheral device. The instruction are operable to receive an instruction for controlling the peripheral device, wherein the logic device is in communication with the peripheral device via a modem and in communication with the host operating system via a generic interface. The instructions are further operable to receive a task request from the operating system via the generic interface, receive an augmentation instruction from the operating system via a meta-behavior interface, and return a task result to the operating system upon completion of the augmented task request.

Other embodiments may further include a computer-readable medium containing an auxiliary program within a logic device in communication with a computing device and a network device executing instructions to create a data storage and a network file system that are foreign to an operating system of the computing device with which to store data to and retrieve data from the network device. The instructions further include steps to receive an instruction from the network device, wherein the logic device is in communication with the network device via a modem and in communication with the computing device via a generic interface, receive a task request from the network device via the modem, receive an augmentation instruction from the network device via a meta-behavior interface and then return a task result to one of the computing device and the network device upon completion of the augmented task request.

Other apparatuses, methods, and/or systems according to embodiments will be or become apparent to one with skill in the art upon review of the following drawings and Detailed Description. It is intended that all such additional apparatus, systems and/or methods be included within this description, be within the scope of the present invention, and be protected by the accompanying claims.

DETAILED DESCRIPTION

The following disclosure is directed to systems, software, methods and devices that use a Gate Array Appliance (a "GAA") or other Programmable Logic Device (a "PLD") to unburden the operating system of a computing system. The use of a PLD may allow the computing system to communicate with any network/Internet based device as if the computing system were communicating with a local network file system through generic high speed serial and/or a network interface. By interposing a PLD between the computing system and a wide area network ("WAN") device, the size, speed, efficiency and resiliency of the host operating system may be significantly enhanced.

Increased operational efficiency is improved by offloading device specific drivers, support software and other portions of the operating system normally required to communicate with a network device to the PLD located on the remote side of the generic interface. The use of a PLD as described herein may enable the design and implementation of the computer operating system to be simplified and may allow additional flexibility by allowing more modular, interchangeable configurations. Non-limiting examples of a WAN device include an asynchronous digital subscriber line ("ADSL") modem, a Synchronous DSL ("SDSL") modem, a cable modem, a router, a server, a computer gateway, and a telecommunications switch.

The subject matter now will be described more fully below with reference to the attached drawings which are illustrative of various embodiments herein. The attached drawings have been simplified to clarify the understanding of the systems, devices and methods disclosed. The subject matter may be embodied in a variety of forms and the exemplary configurations and descriptions, infra, are provided to more fully convey the scope of the disclosure.

A Field Programmable Gate Array ("FPGA") is a non-limiting example of a PLD that may be used in any embodiments consistent with this disclosure. Other non-limiting examples of PLD's may also include Complex Programmable Logic Devices ("CLPD"). Future innovations improving upon the operation and efficiency of FPGA's specifically and PLD's in general are fully contemplated within the scope of the disclosure herein as being components useful in implementing any embodiments discussed below.

Figure 1:
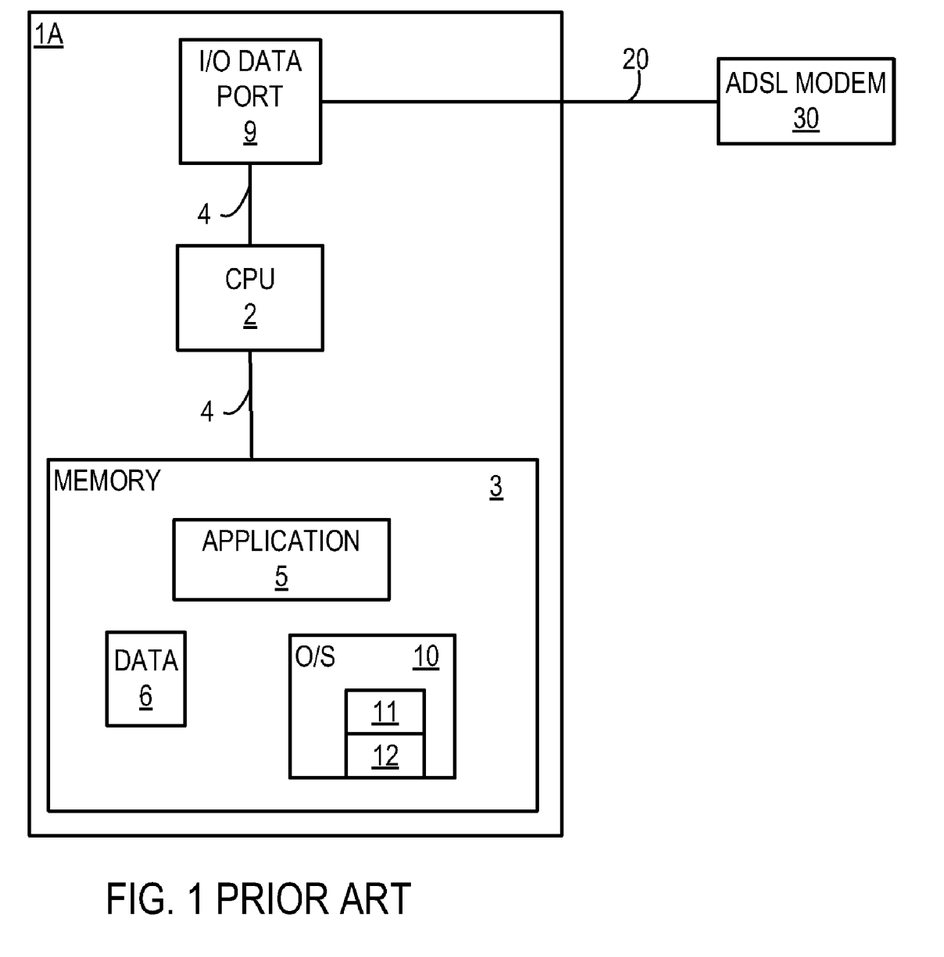
FIG. 1 is an overview illustrating a conventional computer system.

Referring to FIG. 1, each component within an exemplary conventional host computing device (1A, 1B, 1C) and each peripheral attached to it has traditionally been controlled by the host computer's operating system 10 using device specific drivers 12 and management software 11 such as defragmentation programs, disk operating systems, network file systems and the like. The operating system 10, the file systems 11 and the device drivers 12 are usually resident on a memory device 3 and are executed by one or more central processing units ("CPU") 2. The device drivers 12 usually include software objects which are accessed through the operating system 10 by the application programs 5. The device drivers 12 may communicate with devices such as a modem 30 coupled to the computing system 1 through a data port 9 via an interface 20. Data 6 and commands issued from the operating system 10 are communicated among the CPU 2, the memory device 3 and the data port 9 via one or more communication buses 4. The operating system 10 may be any operating system suitable for use with the computing system (A, 1B, 1C). Non-limiting examples of operating systems include AIX or System390 from International Business Machines; Windows95® operating system, Windows98®operating system, Windows2000® or Windows XP® operating system from Microsoft Corporation; Unix; Linux, Mac OS® operating system from Apple Computer, Inc; and/or Solaris operating system from Sun Microsystems. Conventional computing devices may be any type of computing devices.

Figure 2:
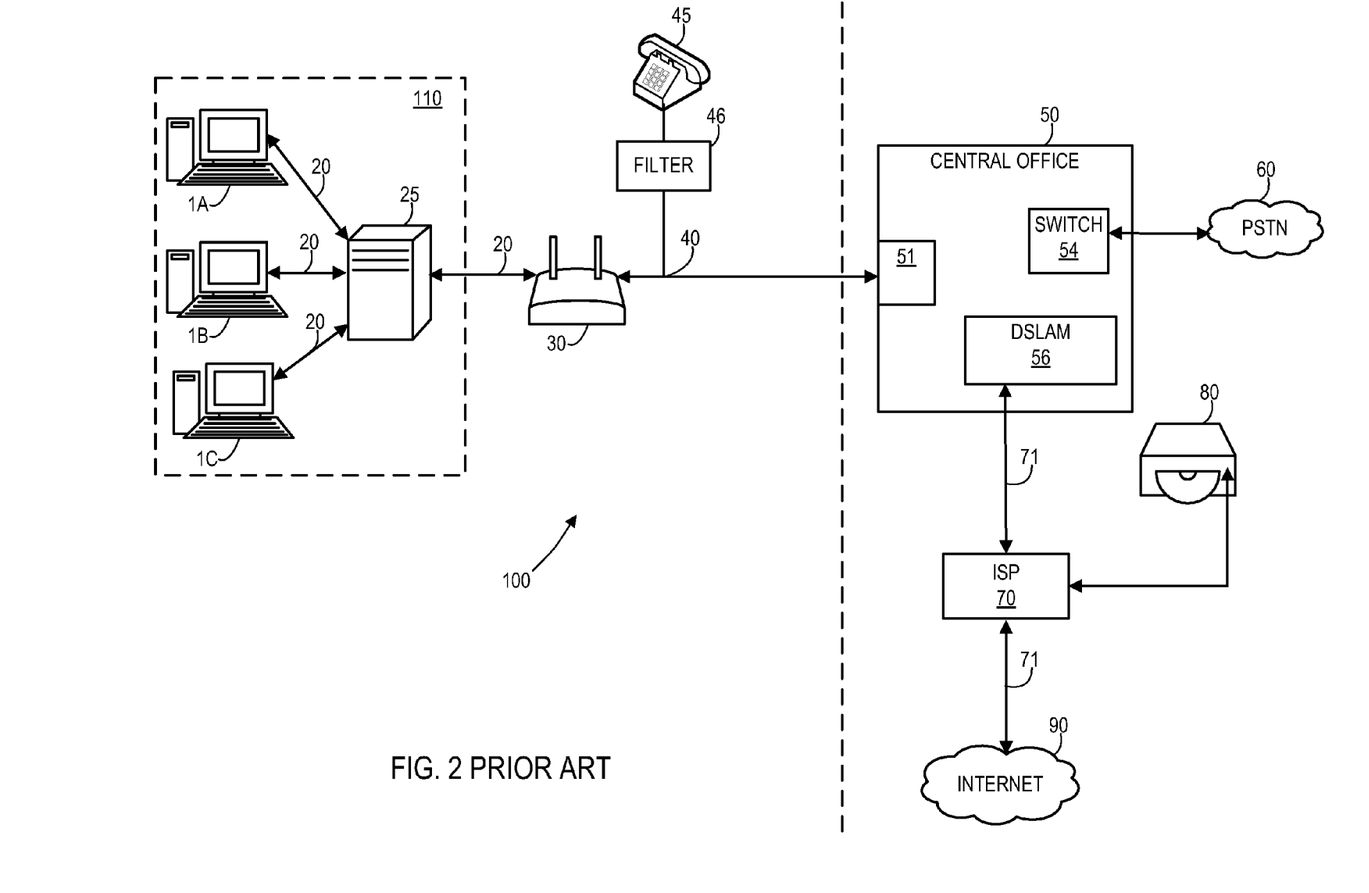
FIG. 2 is an abstract depiction of a prior art DSL modem in communication with a digital communications network.

FIG. 2 illustrates a plurality of computing devices that may be in communication with a Public Switched Telephone Network 60 and a web based storage device 80 through an exemplary network 100. The network 100 is a simplified example for purposes of explanation of the embodiments herein and my entail any type or number of networks including the internet. Although not specifically discussed, the concepts disclosed below may also be used in conjunction with a cable modem in a cable television network.

Each of the computing devices 1A, 1B, 1C may be networked together in a sub-network such as a local network 110. The local network 110 may be any type of network. Non-limiting, exemplary networks may include a Personal Area Network ("PAN"), a Campus Area Network ("CAN"), a Local Area Network ("LAN"), a wireless network and a virtual private network ("VPN"). Computing devices within the local network 110 may be connected together through a network server or a network router 25. Such connections 20 may be wired connections or wireless connections.

The router 25 may act as a connection node between the computing devices 1A, 1B and 1C within the local network 110 and as a gateway by which the computing devices (1A, 1B, 1C) may communicate with remote devices outside the local network 110 such as the network storage device 80. The local network 110 may communicate with devices outside the local network via a WAN device such as the conventional modem 30 which divides up the frequencies available on the telephone line for data transmission.

The modem 30 is a modulating/demodulating device that may be connected to Ethernet network interface cards (not shown) in the computing devices 1A, 1B, 1C or within the network server 25. The modem 30 may translate digital information transmitted from the computing devices (1A, 1B, 1C) or from the network server 25 into an analog signal, and vice versa, suitable for transmission over a twisted pair copper wire 40 to a switch or a central office 50 of the regional telephone service provider 50. Typically the twisted pair copper wire 40 may also connect a local telephone 45, using the same twisted pair copper wire, to the central office 50 as well. A low pass frequency filter 46 typically screens out relatively high frequency data signals from signals transmitted between the central office 50 and the local network 110 allowing normal voice communications to proceed unimpaired by the higher frequency data transmissions using the same twisted pair copper wire 40.

At the telephone system provider central office 50, the signal from the modem 30 may be received at a signal splitter 51. The signal splitter 51 may split the incoming signal into a low frequency voice signal and a high frequency signal. The low frequency signal may then be diverted to a telecommunications switch 54 and ultimately to a PSTN 60 or other network. The high frequency data signal may be diverted to a Digital Subscriber Line Access Multiplexer ("DSLAM") 56 which may allow the telephone provider to connect customer DSL transmissions to an internet service provider ("ISP") 70 via a high-speed internet backbone network 90 using multiplexing techniques. Ultimately the DSL transmissions may be connected to a remote network device 80 that may be located somewhere on the internet 90. Although the ISP 70 is described here in as telephone service provider, the ISP may be any type of service provider such as satellite communications provider, a cable TV provider or a dedicated provider of internet services. As an alternative to using a centralized DSLAM, a distributed network of mini-DSLAMs can also be used. A non-limiting example of a mini-DSLAM is also known as a "52B box".

Although FIG. 2 illustrates only the three client computing devices 1A, 1B, 1C there may be any number of computing devices and/or servers on a network as may satisfy the requirements of a network designer. Non-limiting examples of a computing device may include a computer, a cell phone, a personal digital assistant, an MP3 player, a digital television, an HD television, a set top box related to a television, a digital video recorder ("DVR") and an Internet Protocol TV ("IPTV") device. The number of computing devices and network servers described herein are limited in number to merely simplify the explanation of the embodiments presented herein.

Figure 3:
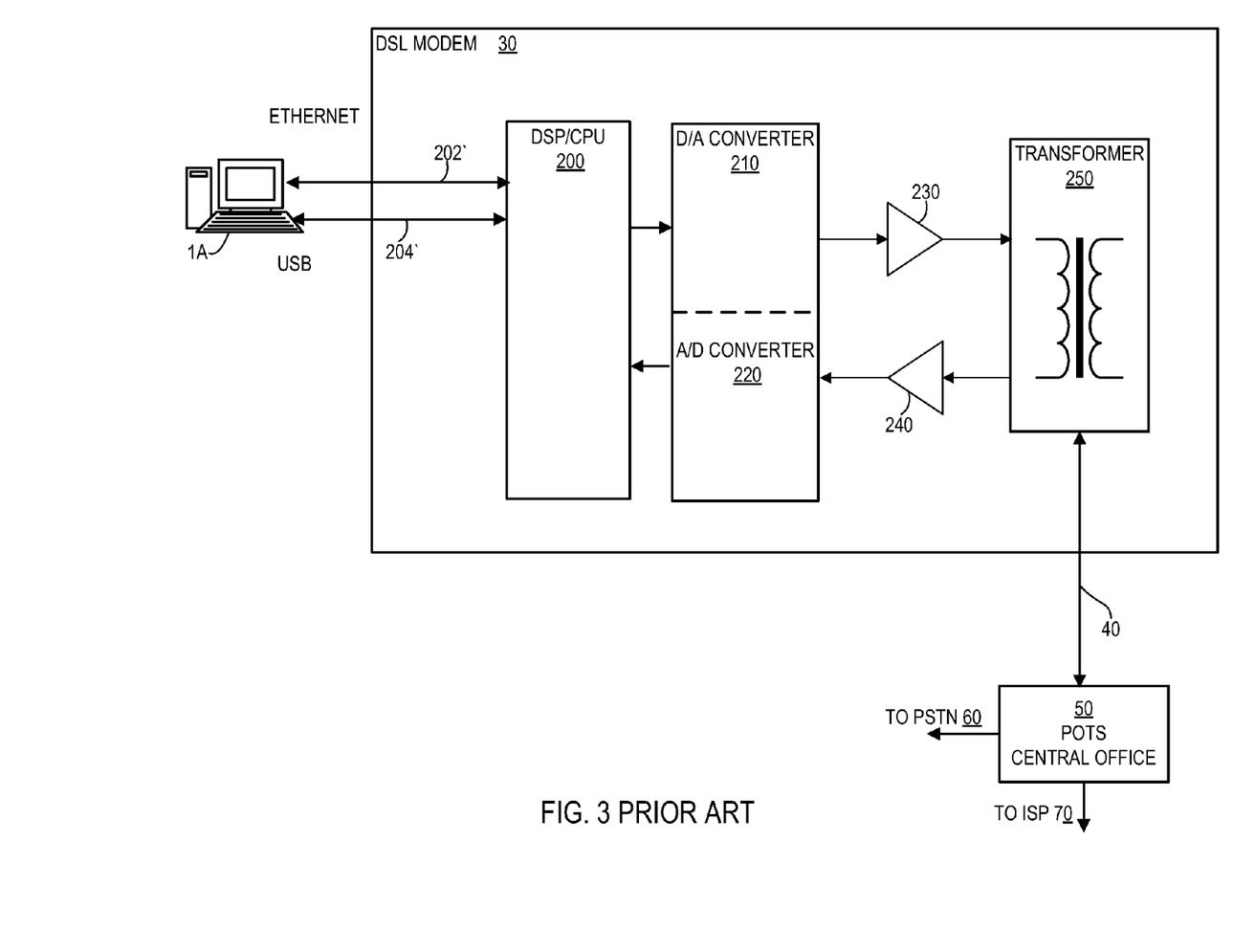
FIG. 3 is a simplified functional diagram of an exemplary conventional DSL modem.

FIG. 3 is a simplified block diagram illustrating the major components of the conventional modem 30 which is an illustrative WAN device according to various embodiments disclosed herein. The computing device 1A, for example, may be in communication with a CPU and/or a Digital Signal Processor ("DSP") 200 via either an Ethernet connection 202 or a USB connection 204. Digital information passed to the modem 30 is processed for transmission over various communication channels created by the modem. The processed information may be passed to a digital-to-analog converter 210 for conversion to a relatively high frequency analog signal which may then be amplified for transmission by line driver 230. The converted analog signal may then be passed to the telephone system 60 by the transformer 250. Information inbound for the computing device 1a may be received over the transformer 250 and amplified for processing by pre-amplifier 240. The incoming signal may then be converted to a digital signal by the analog-to-digital converter 220 and processed for delivery to the computing device 1a by the CPU/DSP 200.

Figure 4:
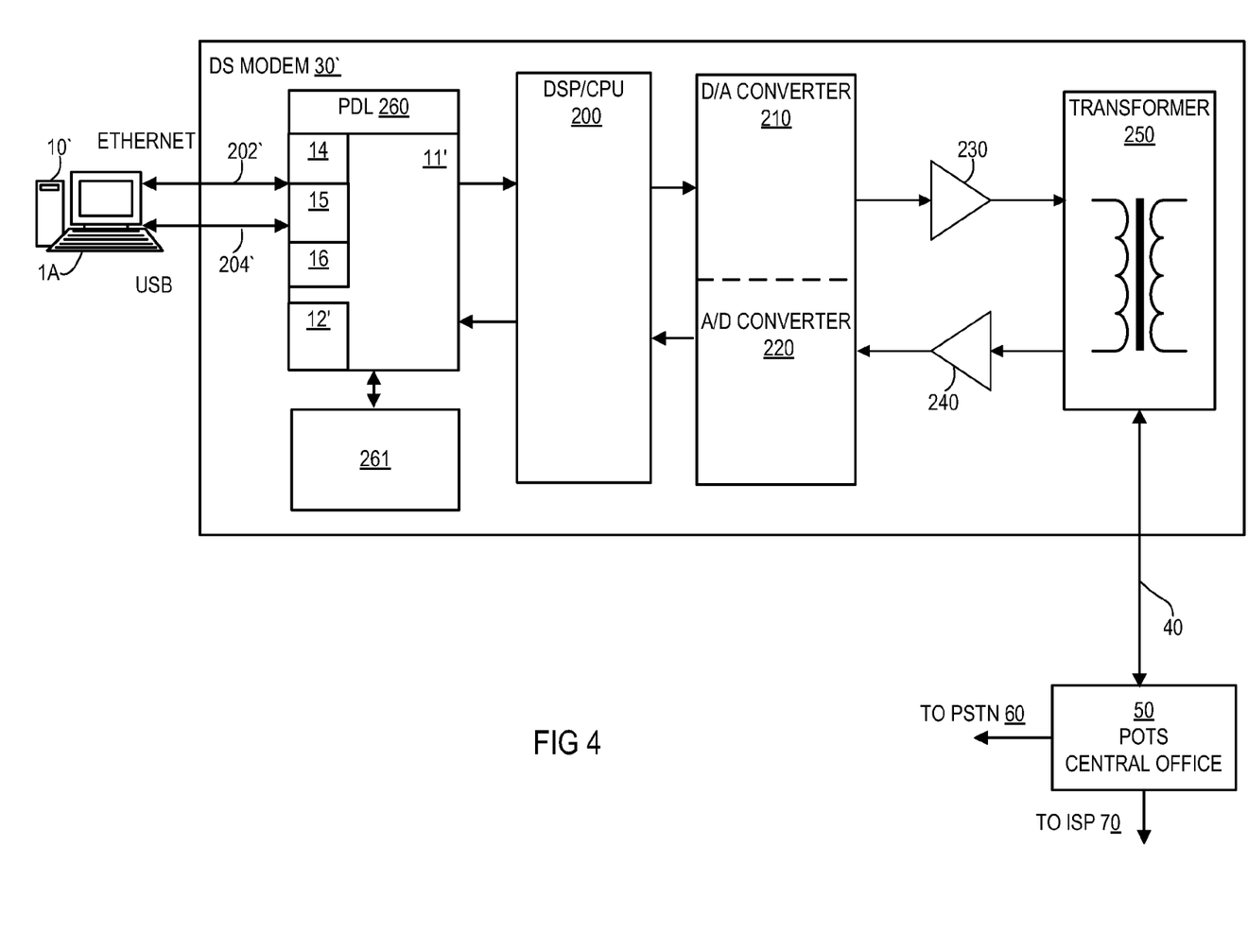
FIG. 4 is a simplified functional diagram of an exemplary DSL modem in conjunction with a PLD within the modem according to various embodiments disclosed herein.

FIG. 4 illustrates an exemplary modem 30' where a PLD 260 has been added to the front end of the conventional modem 30. The PLD 260 may also exist as a unit installed inside the housing of computing device 1a and in communication with the CPU 200 and CPU 2. The PLD 260 may also exist as a stand alone device electrically connected to both the computing device 1a and modem 30'. The PLD 260 may be in direct communication with the CPU 200 or may be connected to the CPU by intervening electronic elements the purpose of which may be deemed advantageous by a manufacturer.

The modem 30' may be any type of existing DSL modem, ADSL modem, ADSL Terminal Unit—Remote ("ATU-R") and the like or may be any type of modem that may be developed in the future. Although, the discussion herein discuss the use of DSL modem for clarity and simplicity, the methods and systems described herein may also be applied to the use of cable modems, router, telecommunication switches and the like as well. The modem 30' may be wireless or a wired device.

The PLD 260 may communicate with the operating system 10' of the computing device 1 via a generic high-speed interface 202'/204'. The generic interface 202'/204' may displace the conventional modem specific interface 202/204 formerly communicating between the modem 30 and the host operating system 10. A non-limiting example of a generic interface 202'/204' may be a generic/standardized high speed internet protocol ("IP") interface and may comprise a generic serial interface 204' and/or a generic network interface 202'.

The generic interface 202'/204' may be a virtual interface wherein the virtual interface may provide both a virtual network interface and a virtual serial interface between the host operating system 10' and the modem 30'. Such a virtual interface is described more fully in the co-owned, co-pending application Ser. Nos. 11/408,766 entitled "Peripheral Hardware Devices Providing Multiple Interfaces and Related Systems and Methods" and 10/918,304 entitled "Logical Remapping of Storage Devices" and both of which are herein incorporated by reference in their entireties. As non-limiting examples, generic interface 202'/204' may be a virtual Ethernet interface or a virtual universal asynchronous receiver-transmitter ("UART") interface.

The electronics of generic high-speed interface 202'/204' may be configured to emulate a plurality of interface standards for communication between the modem 30' and the operating system 10' using the standard device drivers 12'. For example, the electronics of the generic interface 202'/204' may be configured to appear to the operating system 10' as a virtual Ethernet card or virtual serial card. A command interface may thus be provided using a virtual serial interface within the electronics of the generic interface. A functional interface may also be provided using a virtual network interface within the electronics of the generic electronics interface. Optionally, the PLD 260 may also communicate with the operating system 10' via a standard USB interface.

The PLD 260 may unburden the host operating system 10 from the task of controlling and operating modem 30' by programming/reprogramming itself, or allowing itself to be programmed/reprogrammed, with an auxiliary program or an auxiliary operating system 11'. Auxiliary operating system 11' may be operationally foreign to the host operating system 10'. The term "foreign" is not being used herein as limiting the programming of the PLD 260 to an auxiliary operating system 11' that is merely incompatible with the host operating system 10'. The term "foreign" is intended to be more expansive to encompass a mixture of drivers, support software and other instructions some of which may be unrecognizable and/or inoperable by the host operating system other than via the generic interface 202'/204'. It is contemplated herein that that the auxiliary operating system 11' my also incorporate files and instructions copied directly from the operating system 10' as well.

The PLD 260 may cause itself to be reprogrammed from time to time. Such reprogramming may be triggered by any number of events. Non-limiting examples of such events may include the inability to recognize a task request from the host computer system. Other non-limiting examples of events that trigger a reprogramming may also include a scheduled reprogramming, a reprogramming request, and an inability to execute a task request, recognizing a virus, recognizing a hacking attempt or other breach of security.

Although foreign to the host operating system 10', the auxiliary operating system 11' may include programming of similar functionality to portions of the host operating system 10' but be created independently from the host operating system. The auxiliary operating system 11' may be customized to the chipset comprising the PLD 260 or vice versa. Further, the auxiliary operating system 11' may contain software objects that are uniquely generated upon instantiation such that one instantiation of the auxiliary operating system within the PLD 260 is unique to a former or future instantiation of the auxiliary operating system on the same PLD. The auxiliary operating system 11' may use a unique executable language and operate with appropriately matched executable commands. The auxiliary operating system 11' may also include a digital signal processor functionality, the operation of which is also foreign to the computing system (1A, 1B, 1C).

The auxiliary operating system 11' may include a custom network file system that is foreign to the host operating system 10'. Such a custom network file system 14 may be a distributed filing system which utilizes various memory devices distributed across a network. For example, only the PLD 260 may understand the custom network filing system 14 that it has created over the network 90. As such, only the PLD 260 may then access the data that the PLD has distributed over a network 90 (e.g. the internet) to the one or more remote peripherals 80. In such a distributed file system, files and/or parts there of may be securely stored in a disparate number of remote storage devices on the network 90 such as remote device 80.

However, from the viewpoint of the host computing system (1A, 1B, 1C), the custom network filing system 14 may appear to be a conventional filing system internal to the computing system (1A, 1B, 1C) that may be accessed by a standardized network or serial driver 202'/204'. In addition to security, another exemplary advantage to this arrangement is data recovery. If host computing system (1A, 1B, 1C) should experience a failure, upon repair, PLD 260 would be capable of retrieving the data from the various locations on the network 90 for reconstitution within the host computing system.

The auxiliary operating system 11' may include additional applications and functionality. As non-limiting examples, auxiliary operating system 11' may provide instructions allowing Bandwidth On Demand ("BOD") features. The BOD instructions may allow the PLD 260 to analyze transmission parameters in real time. Non-limiting, exemplary parameters may include throughput rate trends, content type being transferred, content availability and bandwidth availability. The PLD 260 may then instruct the modem 30' to increase data throughput rates based upon its analysis. For example, if a person is away from their computing device, their e-mail system may occasionally poll their e-mail server looking for incoming messages and in doing so use a minimal amount if band width (i.e. 1.5 Mbps throughput rate). However, if another family member then sits down to watch a home movie downloaded from the internet the PLD 260 would note the increased bandwidth requirement and instantaneously increase the throughput rate up to a higher level, 6 Mbps for example. Such a usage may also allow the ISP 70 to monitor the usage rate and time of use similarly to how electricity companies monitor kilowatt-hours for billing purposes.

Another non-limiting example of an application that may be included or reprogrammed into the PLD 260 may be an advanced compression/decompression functionality that may be known in the art. Such an application may allow the PLD 260 to monitor a data transmission, compress the data and transmit a code along with the data thereby allowing the proper decompression to occur at the computing device receiving the transmission and all in real time.

Other non-limiting examples of applications that may be executed by the PLD 260 include remote forward and backward domain name service ("DNS") caching. Conventional modems perform only local DNS caching functions for local dynamic host configuration ("DHCP"). Content scanning of packet and data stream content may be another PLD application.

A further non-limiting example of an application may include an anti-virus scan functionality. Such functionality may automatically scan all data traffic proceeding through modem 50 in either direction. Such a scanning functionality would reduce or eliminate the burden normally undertaken by the operating system 11' of the host computing device (1A, 1B, 1C) or by server/router 25. A further advantage of incorporating an anti-virus scan functionality within the PLD 260 would be that the anti-virus service provider would be able to automatically update and/or provision the anti-virus software remotely and in real time without having to interrupt the computing process of the host computing device (1A, 1B, 1C) or router/server 260. Other application features that may occur to one of ordinary skill in the art that may also be programmed into the PLD 260 as may prove useful to accomplish a particular objective including configuring the PLD 260 to implement the modem 30' itself.

The auxiliary operating system 11' may also include a meta-behavior interface 15 which may work in conjunction with standard operating system file instructions 12' and any custom network filing system 14 established by the PLD 260. Meta-behavior may be information or a set of instructions concerning the behavior that a device exhibits in regards to the handling of a file. Meta-behavior may also include instructions to automatically back up files to various locations on the network 90. Any meta-behavior instructions received over the meta-behavior interface 15 may modify and augment any operating system file instructions 12' transmitted to the PLD 260 by the computing system (1A, 1B, 1C) or by the network peripheral 80. The meta-behavior interface 15 uses information about the computer behavior that surrounds the computer's handling of a data file. The meta-behavior interface 15 may mandate behavior concerning the actual handling of a file as opposed to a computer operating system attribute or instruction which merely describes or provides a suggestion concerning how an operating system should handle a file. As a non-limiting example, a conventional operating system such as Windows XP® from Microsoft Corporation may create a file accompanied by an attribute or an instruction that ostensibly makes the file "read-only". However, such an attribute is not absolute. User applications may over ride such an attribute from the operating system. However, the meta-behavior interface 15 may translate or augment the operating system "read-only" file attribute accompanying the file and thereby reinterpreting the attribute as making the read-only status absolute unless again modified by the meta-behavior interface.

The auxiliary operating system 11' also may include a meta-behavior interpreter 16 which may be a rules engine. The meta-behavior interpreter 16 may receive standard operating system 11' file instructions/attributes and may augment those instructions or may issue meta-behavior instructions on its own based on inference and/or historical events based on usage, file name, location and the like. As such, files may be more flexibly processed. As non-limiting examples, the meta-behavior interface 15 may identify files as protected files, may designate disk space as a pagefile, and the like.

Meta-behavior instructions may also be received by the PLD 260 from the ISP 70, the central office 50 or from another service provider. A non-limiting example of an ISP may be the U-VERSE® service from AT&T. For example, the U-VERSE® service may desire to distribute its latest software package update to their customer base. The provider may upload and cache its software package on each customer's PLD 260 along with appropriate meta-behavior instructions to the PLD 26 on how to secure and provision the software should a particular customer desire to install the software on his computing device 1A, for example. Once the software package is cached, the customer is notified that a task request has been received and completed by the PLD 260. Should the customer choose to review and install the software package, the installation from the PLD 260 would be virtually instantaneous as the computing device 1A would be accessing the data via a local standardized high speed serial or network interface. No delay for downloading would be necessary. Such an arrangement may allow the near instantaneous provisioning of a customer's system while on the telephone or online with a central office representative.

The PLD 260, being reprogrammable in real time, may include any requisite digital signal processing software that may be incorporated into the DPS/CPU 200. Similarly, the PLD 260 may contain a unique digital signal processor the process (or algorithm) by which the CPU 200 creates frequency channels or otherwise processes incoming and outgoing data. Therefore, the PLD 260 may be used for such exemplary features as providing dynamic "bandwidth on demand", providing advanced compression/decompression functionality, and providing dynamic switching between synchronous DSL ("SDSL") and ASDL formats. The DSP software may allow the PLD 260 to communicate with any type of remote network device. Exemplary devices may include an SDSL modem and/or and ATU-R. As such, the modem 30' (and any remote network device in communication with the modem 30' such as network device 80) may appear to the operating system 10' to be a standard network file system available to the computing device (1A, 1B, 1C) where entire files may be requested instead of the host operating system 10' having to directly control the function of modem 30' and then read and write blocks of data to compile a file.

The PLD 260 may be associated with one or more memory devices 261 such as a read-only memory ("ROM"), a random access memory ("RAM") and/or flash memory to provide operational flexibility by providing working space and a disposable cache to facilitate the fast storage and retrieval of block maps. The memory device 261 may be comprised of any number or types of memory devices that conform to a manufacturer's requirements. Examples of memory devices include magnetic disks, optical disks, flash memory, memory sticks and RAM. The memory may be volatile or non-volatile or a combination thereof. RAM may be any type of RAM currently existing or developed in the future. Non-limiting examples of RAM may include Ferroelectric RAM, Magnetoresistive RAM, Phase-change RAM, Semiconductor-Oxide-Nitride-Oxide-semiconductor memory, Resistance RAM, Nano-RAM, Dynamic RAM ("DRAM"), embedded DRAM, Static RAM ("SRAM"), 1T-SRAM from Monolithic System Technology, Inc., Zero capacitor RAM and Twin Transistor RAM. A ROM may be any type of ROM currently existing or developed in the future. Non-limiting examples of ROM may include Programmable ROM ("PROM"), Erasable PROM ("EPROM"), and Electronically EPROM ("EEPROM").

The PLD 260 and the memory device 261 are illustrative examples of computer readable media. Other illustrative examples of computer readable media include optical disks (Compact Disks, Digital Video Disks, etc), magnetic disks, and computer processors regardless of functionality. Any media where data may be written to and read from whether currently existing or developed in the future are operationally consistent with the disclosure herein.

Once transferred to the PLD 260 via the generic interface 202/204', the PLD may assume the operation of the modem 30' and decides how to format or process files based on usage and any special handling instructions via the meta-behavior interface 15. As such, modem housekeeping functions may be carried on in the background without the host operating system 10' being involved.

The PLD 260 as described herein may be programmed in a number of ways. The PLD 260 may be preprogrammed by the modem manufacturer such that the auxiliary operating system required to operate the modem 30' is contained in the flash memory 261 and flashes the PLD 260 upon boot up. Any number of non-volatile memory devices may be used for this function. A manufacturer may also include other means for programming the PLD such as including a read only memory or other device that meets a particular manufacturer's requirement.

Alternatively, the modem flash memory 261 may cause the PLD 260 to request or draw the required programming from the host operating system 10' upon boot up using, for example, a bin loader program or there may be a combination of both a draw from the operating system 10', a programming from the flash memory 261 or a draw from a network resource such as the Central Office 50, or a combination thereof.

Further, the PLD 260 may have programming pushed to it from a remote source. Non-limiting examples of such sources may include a telephone, television or internet service provider 70. As such, a service provider 70 my provision the customer modem 30' remotely and instantaneously with new services. Such a capability may simplify the service provider's sales effort and reduce installation and service costs. For example, provisioning SDSL typically requires modifications to the user's modem 30 which is done manually by a service technician. Instead, the PLD 260 may enable the dynamic configuration of the modem 30' to support SDSL virtually instantaneously while the customer is still on the phone with the sales representative.

Figure 5:
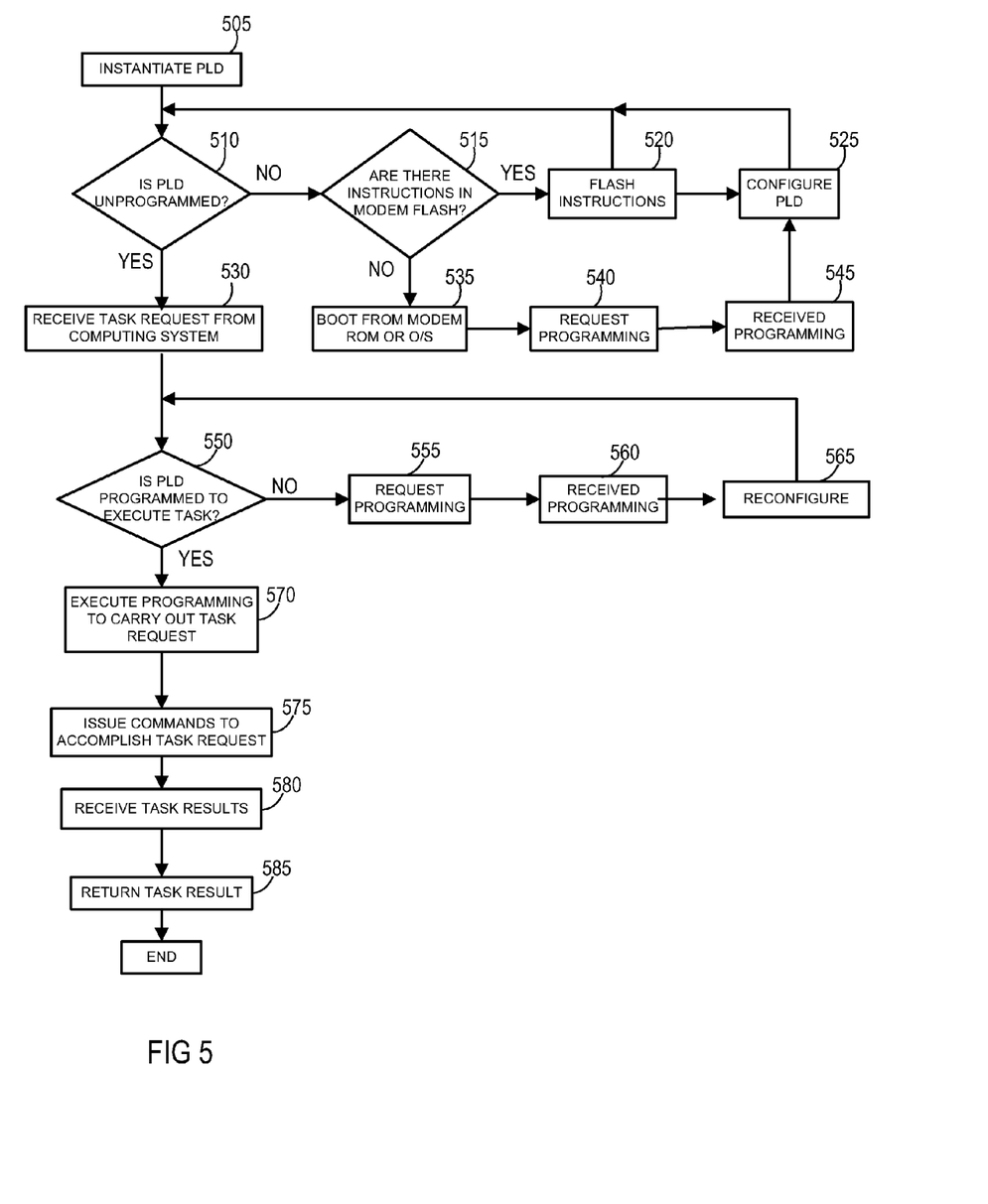
FIG. 5 is a flow diagram depicting the general operation of a PLD operating between the computing device and a network device according to various embodiments disclosed herein.

FIG. 5 is a flow chart illustrating a method for using the PLD 260 as described above. At process 505, the PLD 260 within the computing device 1 is instantiated. The instantiation may be required because the computing system is undergoing a normal power up or because the PLD 260 has been newly installed. Once instantiated, one of the PLD 260, the computing system 10', the network device 80, the flash memory and/or ROM 261 determines if the PLD 260 has been programmed for operation at process 510. If the PLD 260 is unprogramed, it is determined whether the flash memory 261 of the modem 30' contains auxiliary instructions at process 515. If the flash memory 261 contains instructions for the PLD 260, then the flash memory 261 flashes the PLD at process 520. If no instructions in the flash memory 260 exist, then instructions need to be obtained from another source at process 535. As non-limiting examples such instructions may come from the operating system 10' or the remote device 80. Programming is requested at process 540. At process 545, the PLD 260 receives its programming.

Once the PLD 260 receives its programming, the PLD is configured according to the instructions received at process 525 and is thereby ready for operation in conjunction with the host operating system 10' and/or the network device 80. Once configured, the PLD 260 may receive a task request from the operating system 10' for the remote device 80 (or vice versa) via the generic interface 20 at process 530. It may be the case that the PLD 260 may be programmed but it is not properly programmed to execute the specific task required at decision point 550. If the PLD 260 is not properly programmed, then the PLD 260 may request the required programming from the host operating system 10' or another source such as the network device 80 at process 555. The basis and/or direction of such a request may be based on a preprogrammed priority or based on a deductive reasoning functionality utilizing current or historical circumstances. At process 560, the proper programming is received over the generic interface 202'/204' or over the network 90. The PLD 260 is reconfigured at process 565.

Once properly configured, the PLD 260 executes its programming to carry out the task request at process 570 utilizing any augmenting instructions from the meta-behavior interface 15. The task request may be a basic file management task that may require only simple commands. Non-limiting examples of such tasks may be renaming files, moving files, deleting files, storing files and the like. Other tasks may require more sophisticated instructions. For example, the task of reading a file may require transferring non-cached elements from their network storage locations, reconstituting the file and transfer the entire file to the requestor based on available memory including memory storage capability within the PLD 260. Read file instructions may be facilitated by the PLD 260 by using a network pre-fetch technique. Write file instructions may include buffering the data within the PLD 260 and then streaming the data to the various distributed network devices 80 as efficiently as possible given bandwidth and network constraints.

As mentioned above, in addition to conventional digital signal processing functions conventionally executed by the DSP 200 for the normal conversion and transport of data, the PLD 260 may execute additional functions such as digital compression and bandwidth management. Based on the task request, the PLD 260 issues one or more commands to the remote device 80 and/or the operating system 10' to accomplish the task request. The commands may be transmitted over the network 90 via the modem 30' or over the generic interface 202'/204'. Once the task request is completed, the PLD 260 receives the task from the remote device 80 and/or the operating system 10', processes and reformats them if necessary and forwards the results to the appropriate destination. Optionally, should the computing device (1A, 1B, 1C) contain other PLDs executing auxiliary operating systems other than the auxiliary operating system 11', the PLD 260 may also take instructions from, provide data to and otherwise cooperate with those other PLDs without the operating system 10' or the network device 80 necessarily becoming involved.

Further, file specific copyright security may be implemented through the use of the subject matter described herein. As a non-limiting example, as the information is received from the network device 80, a data string may be copied to the file such that the file may become non-functional should it be retransmitted from the computer device (1A, 1B, 1C) unless authorized by instructions resident in the PLD 260. Other more sophisticated DRM methods may include a contact scrambling method or use of payment gateway software provisioned within the PLD 260.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. An apparatus in communication with a computing system comprising:
    an interface, whereby the computing system employs the apparatus;
    a programmable logic device ("PLD") in communication with the computing system through the interface, the PLD communicating via the interface using a first file system protocol to store and to retrieve data from a network peripheral device, the PLD also being in communication with the network peripheral device via a modem and communicating with the network peripheral device using a second file system protocol that is foreign to the computing system to store and retrieve data using the network peripheral device on behalf of the computing system.

2. The apparatus claim 1, wherein the apparatus is resident in a modem.

3. The apparatus of claim 2, wherein the wide area network modem is a digital subscriber line ("DSL") modem.

4. The apparatus of claim 1 wherein the PLD is programmed with an auxiliary operating system that is foreign to the operating system.

5. The apparatus of claim 4 wherein the auxiliary operating system executes a data security function otherwise performed by the computing system.

6. The apparatus of claim 4 wherein the auxiliary operating system includes instructions for automatically compressing and decompressing data that is transmitted to and received from the network peripheral, respectively.

7. The apparatus of claim 1 wherein the interface comprises one or more virtual Ethernet interfaces and/or one or more virtual serial interfaces.

8. The apparatus of claim 7 wherein the computing system communicates over the interface by one of a conventional network driver and a conventional serial driver.

9. The apparatus of claim 1 wherein the first file system is a conventional network file system and the second file system is a distributed network file system which is not perceived by the computing system.

10. The apparatus of claim 9 wherein the PLD caches data received from the network peripheral device that is requested by the computing system via the first file system.

11. The apparatus of claim 1, wherein the network peripheral device is a data storage device.

12. The apparatus of claim 1, wherein the PLD receives an instruction for controlling the network peripheral device from the computing system and the instruction is re-instantiated from time to time and comprises a combination of both an executable language and corresponding executable commands.

13. The apparatus of claim 1, wherein a task request is received from the computing device via the interface to be accomplished according to the instruction, the task request being sent via one of a network driver and a serial driver.

14. The apparatus of claim 1, wherein the computing device is another PLD.

* * * * *